United States Patent [19]
Matsui

[11] Patent Number: 5,521,651
[45] Date of Patent: May 28, 1996

[54] AUTOMATIC FINE TUNING DETECTION CIRCUIT

[75] Inventor: Toshiya Matsui, Tokyo, Japan

[73] Assignee: NEC Corporation, Tokyo, Japan

[21] Appl. No.: 323,277

[22] Filed: Oct. 14, 1994

[30] Foreign Application Priority Data

Oct. 15, 1993 [JP] Japan ................................ 5-257944

[51] Int. Cl.⁶ ............................................... H04N 5/50
[52] U.S. Cl. .................................... 348/731; 455/192.3
[58] Field of Search .................................. 348/731, 733; 455/173.1, 182.2, 182.3, 192.2, 192.3; H04N 5/50

[56] References Cited

U.S. PATENT DOCUMENTS

| | | | |
|---|---|---|---|
| 4,601,060 | 6/1986 | Wine | 455/192.3 |
| 5,132,799 | 6/1992 | Gakumura | 348/731 |

*Primary Examiner*—Victor R. Kostak
*Attorney, Agent, or Firm*—Young & Thompson

[57] ABSTRACT

A system for carrying out automatic fine tuning detection comprising a generating section for generating a video intermediate frequency signal from a radio wave, a filtering section connected to the generating section for filtering the video intermediate frequency signal supplied from the generating section, the filtering section having low and high frequency regions having different gains from each other, a subtracting section connected to both the generating section and filtering section for subtracting an output signal of the filtering section from the video intermediate frequency signal supplied by the generating section, an extracting section connected to the filtering section for fetching the output signal of the filtering section and subsequent extraction of a video carrier wave signal component from the output signal and a multiplying section connected to the subtracting section, the extracting section and the generating section for multiplying an output signal of the subtracting section by an output signal of the extracting section and subsequent conversion into a voltage signal to be fed back to the generating section to thereby control a frequency of the video intermediate frequency signal at a predetermined value.

11 Claims, 3 Drawing Sheets

AUTOMATIC FINE TUNING DETECTION CIRCUIT

BACKGROUND OF THE INVENTION

1. Field of the Invention

The invention relates to an automatic fine tuning detecting circuit, and more particularly to an automatic fine tuning detecting circuit involved in an automatic frequency controller for tele-receiver tuning in which the automatic fine tuning detecting circuit fetches a carrier wave component from a video signal of intermediate frequency for achievement of a video detection.

2. Description of the Related Art

A circuit configuration including a conventional automatic fine tuning detecting circuit as known in the art is as illustrated in FIG. 1. An antenna 1 receives a radio wave for television so that the radio wave is converted into an radio frequency electrical signal that will subsequently be transmitted to a tuner 2. The tuner 2 converts the radio frequency electrical signal into a video intermediate frequency signal. The video intermediate frequency signal is then transmitted into a SAW filter 3 for receiving a restriction of bandwidth thereof or filtering. The filtered video intermediate frequency signal is transmitted into a video intermediate frequency amplifier circuit 4 for amplification thereof. The amplified signal is then transmitted into both a carrier amplifier 5 and a video detecting circuit 6. The carrier amplifier 5 is provided with a filter 8 having a center frequency that corresponds to a frequency of the video intermediate frequency signal. This conventional automatic fine tuning detecting circuit utilizes a pseudo-synchronous detecting system in which a carrier wave signal is fetched from the video intermediate frequency signal for synchronous detection. The carrier amplifier 5 fetches the carrier wave signal from the video intermediate frequency signal so that the filter 8 may serve as a selective transmitter. The fetched carrier wave signal is then transmitted into the video detecting circuit 6 that serves as a multiplier wherein a synchronous detection of the carrier wave signal with the amplified signal from the video intermediate frequency amplifier circuit 4 is carried out for detection of a video signal and subsequent output thereof from the video detecting circuit 6. The above described video signal detection is carried out at a 0 degree of phase difference between the output signals from the carrier amplifier 5 and from the video intermediate frequency amplifier circuit 4.

By contrast, the automatic fine tuning detection is carried out by an automatic fine tuning detecting circuit 15 that is provided with an automatic fine tuning detecting filter 14. The automatic fine tuning detecting filter 14 is connected to the filter 8 of the carrier amplifier 5 through capacitors 13 so that the filter 14 exhibits a signal differing in phase by 90 degrees from the signal on the filter 8. The automatic fine tuning detecting circuit 15 multiplies an output signal supplied from the carrier amplifier 5 with the signal appearing on the automatic fine tuning detecting filter 14. The automatic fine tuning detection differs from the video detection in a phase difference by 90 degrees between them. In the automatic fine tuning detection, when the output from the carrier amplifier 5 has a frequency difference from the predetermined center frequency of the video intermediate frequency signal, the automatic fine tuning detecting circuit 15 generates an output signal having a variation in voltage whose amount corresponds to an amount of the frequency difference. The output signal having the voltage variation is then fed back to the tuner 2 through a filter 16 so that the video intermediate frequency signal outputted from the tuner 2 is automatically controlled at the center frequency. The difference in frequency may be detected by the automatic fine tuning detecting circuit 15 by multiplying the output signal from the carrier amplifier 5 with the signal that has passed through a phase circuit comprising the capacitors 13 and the filter 14. The detected frequency difference is then converted into a voltage. The phase circuit is so constructed that filter 14 has a signal having a difference in phase by 90 degrees from the signal appearing on the filter 8 to permit a variation in frequency of the signal to generate a variation in phase thereof. Namely, the phase circuit may be regarded as a quadrature circuit that is disclosed in the Japanese patent publication No. 62-11550.

The above described automatic fine tuning detecting circuit has disadvantages as mentioned below. The conventional automatic fine tuning detecting circuit requires two filters in which one is provided to the carrier amplifier 5 for pseudo-synchronous detection and the another is provided to the automatic fine tuning detecting circuit for the automatic fine tuning detection. The conventional automatic fine tuning detecting circuit requires at least two adjustments by an individual. The two filters have the same center frequency but have a difference in phase by 90 degrees from each other. Those may cause an interference between the two filters. This results in an inferior of circuit detection performance under a condition of a weak field.

SUMMARY OF THE INVENTION

Accordingly, it is a primary object of the present invention to provide a novel automatic fine tuning detecting circuit free from any disadvantage as described above.

It is a further object of the present invention to provide a novel automatic fine tuning detecting circuit having a small number of elements constructing the circuit.

It is a another more object of the present invention to provide a novel automatic fine tuning detecting circuit that requires a small amount of adjustments of elements involved in the circuit.

It is a another more object of the present invention to provide a novel automatic fine tuning detecting circuit that is free from any interference between filters involved in the circuit.

The above and other objects, features and advantages of the present invention will be apparent from the following descriptions.

The invention provides a system for carrying out automatic fine tuning detection. The system comprises an antenna for receiving a radio wave and subsequent conversion into a radio frequency electrical signal, a tuner connected to the antenna for converting the radio frequency electrical signal into the video intermediate frequency signal, an amplifier circuit connected to the filter for amplifying the video intermediate frequency signal, a filtering section connected to the amplifier circuit for filtering the amplified video intermediate frequency signal supplied from the amplifying circuit wherein the filtering section has low and high frequency regions having different gains from each other, a subtracting section connected to both the amplifying circuit and the filtering section for subtracting an output signal of the filtering section from the video intermediate frequency signal supplied by the amplifying circuit, an extracting section connected to the filtering section for fetching the output signal of the filtering section and subsequent extraction of a video carrier wave signal component from the output signal wherein the extracting section comprises a carrier amplifier circuit and a filter having the same center frequency as the predetermined frequency of the video intermediate frequency signal generated by the generating section and a multiplying section being connected to the subtracting section, the extracting section and the tuner for multiplying an output signal of the subtracting section by an output signal of the extracting section and subsequent conversion into a voltage signal to be fed back to the generating section to thereby control a frequency of the video intermediate frequency signal at a predetermined value.

BRIEF DESCRIPTIONS OF THE DRAWINGS

Preferred embodiments of the present invention will hereinafter fully be described in detail with reference to the accompanying drawings.

PREFERRED EMBODIMENTS OF THE INVENTION

The present invention provides a novel automatic fine tuning detecting circuit that comprises a filter circuit for filtering a video intermediate frequency signal wherein the filter circuit has high and low frequency parts having different gains from each other, a subtracting circuit for subtracting an output of the filter circuit from the video intermediate frequency signal, an extracting circuit for extracting a video carrier wave signal component from the output signal of the filter circuit and a multiplying circuit for multiplying the output signal of the extracting circuit by the output of the subtracting circuit to apply a local part oscillation frequency control voltage into a tuner.

In operation of the novel automatic fine tuning detecting circuit according to the present invention, the video intermediate frequency signal is inputted into the filter circuit to pass through the filter circuit. The subtracting circuit subtracts the signal passed through the filter from the video intermediate signal that has not passed through the filter to generate signals having a phase difference by 90 degrees from each other, one of which is inputted into a carrier amplifier for carrier extraction thereof to extract a carrier signal for pseudo-synchronous detection. The extracted carrier is then inputted into the multiplying circuit to be multiplied by the another signal having the phase difference by 90 degrees from the one signal for automatic fine tuning detection. The phase circuit acting for the automatic fine tuning detection may also act as a filter for the carrier extraction. As compared to the conventional automatic fine tuning circuitry, the novel automatic fine tuning circuitry requires a small number of elements. The novel automatic fine tuning detecting circuit requires a single adjustment for the single filter. The novel circuitry is free from the requirement to provide two filters that have the same center frequency but have a difference in phase by 90 degrees from each other. Those features may permit the novel circuitry to be free from any problem with an interference between the filter. This permits the novel circuitry to exhibit excellent circuit performances even under a condition of a weak field.

Figure 1:
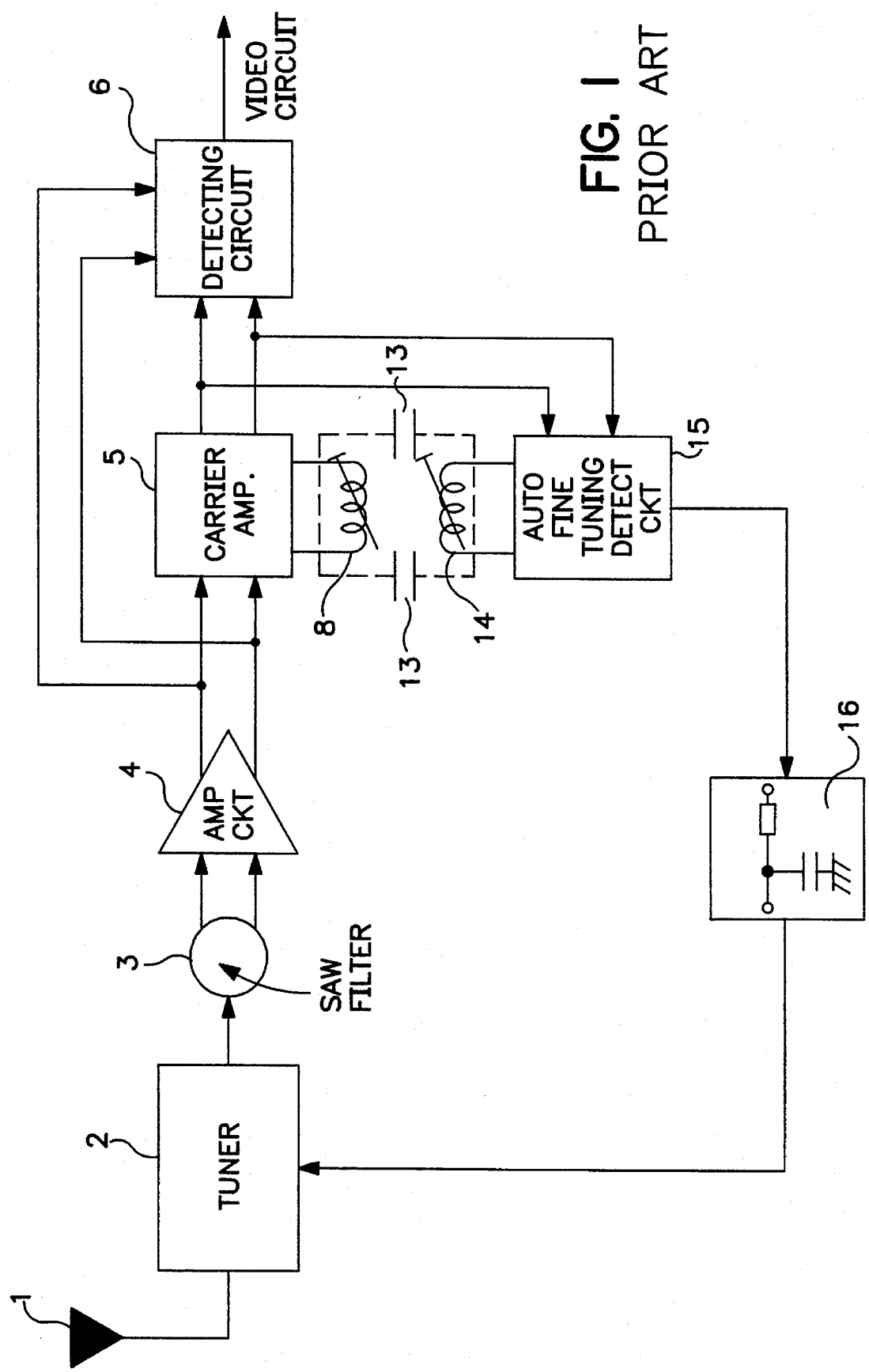
FIG. 1 is a circuit diagram illustrative of a configuration of the conventional automatic fine tuning detecting circuit.
Figure 2:
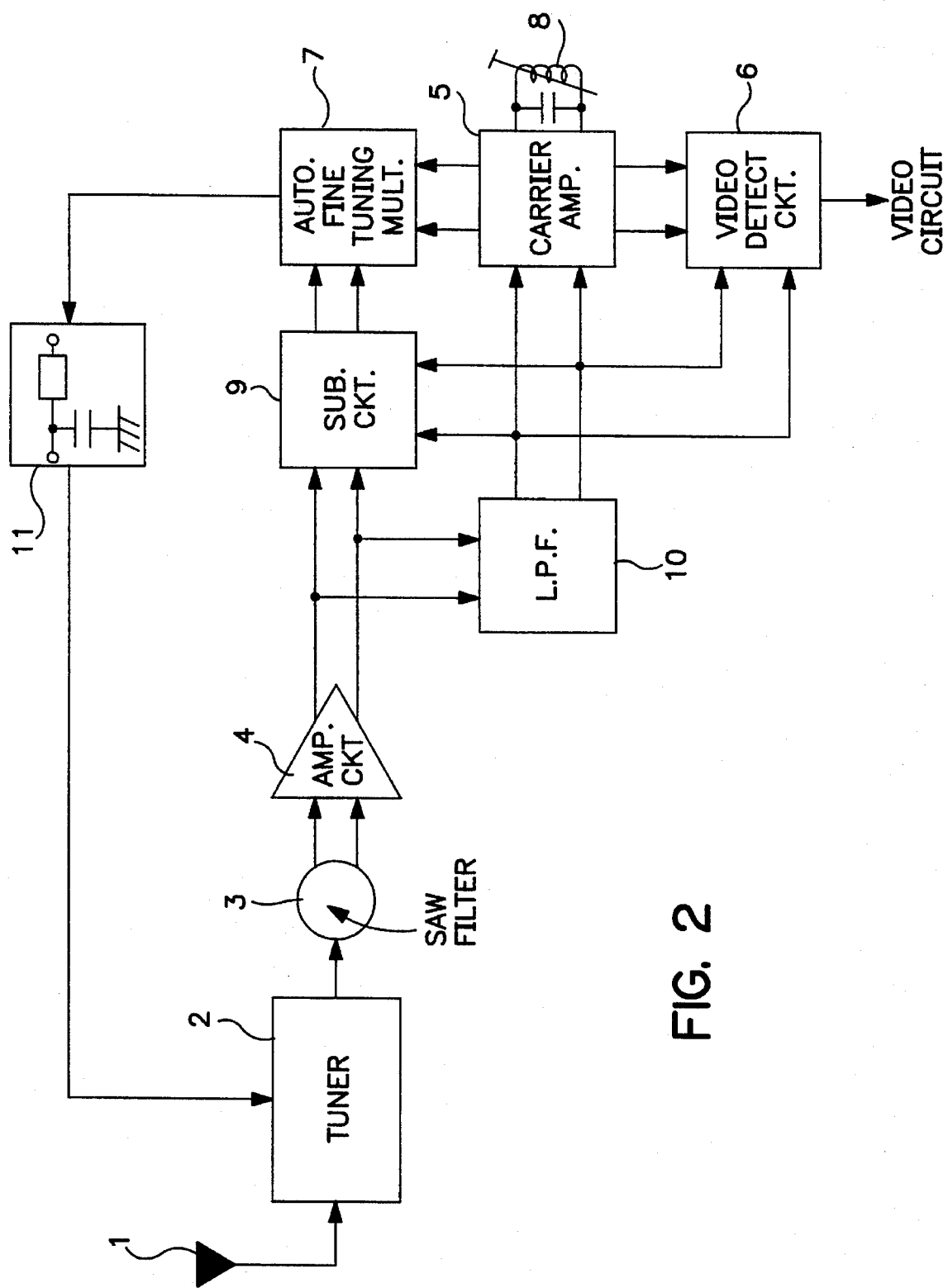
FIG. 2 is a circuit diagram illustrative of a configuration of a novel automatic fine tuning detecting circuit in a first embodiment according to the present invention.

The description will focus on a circuit configuration of a novel automatic fine tuning detection system in a first embodiment according to the present invention with reference to FIG. 2. The novel automatic fine tuning detection system has an antenna 1 for receiving a radio wave to be converted into a radio frequency electrical signal. The novel automatic fine tuning detection system also has a tuner 2 into which the radio frequency signal received by the antenna 1 is transmitted for conversion of the radio frequency signal into a video intermediate frequency signal. The novel system also has a SAW filter for filtering the video intermediate frequency signal for bandwidth restrictions thereof. The novel system also includes a video intermediate frequency amplifier circuit 4 for amplifying the filtered video intermediate frequency signal transmitted from the SAW filter 3. The novel system also includes a low pass filter 10 constructing a linear filter and a subtracting circuit 9 in which the amplified video intermediate frequency signal is transmitted into both the subtracting circuit 9 and the low pass filter 10. The low pass filter 10 filters the amplified video intermediate frequency signal. The novel system also includes a video detecting circuit and a carrier amplifier 5 being provided with a filter 8 having a center frequency that corresponds to a frequency of the video intermediate frequency signal. The filtered video intermediate frequency signal of the low pass filter 10 is then supplied into the subtracting circuit 9, the carrier amplifier 5 and the video detecting circuit 6. The filtered video intermediate frequency signal of the low pass filter 10 or the output signal of the low pass filter 10 serves as a reference signal in this novel system. The subtracting circuit 9 subtracts the output signal of the low pass filter 10 from the amplified video intermediate frequency signal fetched from the video intermediate frequency amplifying circuit 4 to thereby generate an output signal having a phase difference by 90 degrees from the output signal supplied from the low pass filter 10. The novel system further includes an automatic fine tuning multiplier 7 into which the output signal of the subtracting circuit 9 is transmitted. The carrier amplifier 5 provided with a filter 8 which extract a carrier wave signal from the filtered video intermediate frequency signal supplied from the low pass filter 10 for subsequent transmission of the extracted carrier wave signal into the video detecting circuit 6 and the automatic fine tuning multiplier 7. The video detecting circuit 6 constitutes a multiplying circuit for performing a synchronous detection of the carrier wave signal extracted by the carrier amplifier 5 with the output signal of the low pass filter 10 to thereby detect a video signal. The detected video signal is outputted from the video detecting circuit 6. The automatic fine tuning multiplier 7 multiplies the output signal of the carrier amplifier 5 by the output signal of the subtracting circuit 9 for automatic fine tuning detection. This automatic fine tuning detection may be carried out in the quadrature system that requires a filter for converting a variation in frequency of signals into a variation in phase thereof. The filter 8 provided to the carrier amplifier 5 may serve as the filter that may convert any variation in frequency of the signal into a variation in phase. An output of the automatic fine tuning multiplier 7 is then fed back through a filter 11 into the tuner so that the center frequency of the video intermediate frequency signal is controlled at a predetermined value.

This automatic fine tuning detection may also be described by referring the following equations.

The low pass filter 10 and the filter 8 provided to the carrier amplifier 5 have transfer functions $L(f)$ and $B(f)$ given by equations (1) and (2) respectively.

$$L(f) = 1/(1+j(f/f_c)) \tag{1}$$

$$B(f) = (j(f/f_0)(1/Q))/(1+j(f/f_0)(1/Q)-(f/f_0)^2) \tag{2}$$

where $f_c$ is the cutoff frequency of the low pass filter 10, $f_0$ is the center frequency of the video intermediate frequency carrier wave signal, Q is the degree of selection of the filter 8.

The output signal $E_0(f)$ of the video intermediate frequency amplifier circuit 4, the output signal $E_1(f)$ of the low pass filter 10 and the output signal $E_2(f)$ of the output signal of the subtracting circuit 9 as well as the output signal $E_3(f)$ of the carrier amplifier 5 are expressed by the following equations respectively.

$$\begin{aligned} E_1(f) &= L(f)E_0(f) \\ &= E_0(f)/(1+j(f/f_c)) \end{aligned} \tag{3}$$

$$\begin{aligned} E_2(f) &= E_0(f) - E_1(f) \\ &= E_0(f)(1 - L(f)) \\ &= E_0(f)(j(f/f_c))/(1+j(f/f_c)) \end{aligned} \tag{4}$$

The output signal $E_1(f)$ has a difference in phase by 90 degrees from the output signal $E_2(f)$. The output signal $E_1(f)$ is inputted into the carrier amplifier 5 to be converted into the output signal $E_3(f)$. Then, the output signal $E_3(f)$ may be expressed by the following equation.

$$\begin{aligned} E_3(f) &= B(f)E(f) \\ &= ((j(f/f_0)(1/Q))E_1(f)/(1+j(f/f_0)(1/Q)-(f/f_0)^2) \end{aligned} \tag{5}$$

When $f=f_0$, a difference in phase between the output signals $E_3(f)$ and $E_1(1)$ is zero. In this case, the phase property of the transfer function $B(f)$ is defined by the phase property of the phase of the output signal $E_3(f)$. The phase property of the transfer function $B(f)$ is expressed by the following equation.

$$\begin{aligned} \phi &= -\tan^{-1}((1/Q)(f/f_0)/(1-(f/f_0)^2) + \pi/2 \\ &= \pi/2 - \tan^{-1}((f_0 f)/(f_0^2 - f^2)(1/Q)) \end{aligned} \tag{6}$$

where $\phi$ is the phase of the filter 8 having the transfer function $B(f)$. When $f=f_0$, the phase of the filter 8 is zero. The output signals $E_1(f)$ and $E_2(f)$ have a difference in phase by 90 degrees from each other. Then, a difference $\theta$ in phase between the output signals $E_2(f)$ and $E_3(f)$ is expressed by the following equation.

$$\begin{aligned} \theta &= E_2(f) - E_3(f) \\ \theta &= \pi/2 = \pi/2 + \tan^{-1}((f_0 f)/(f_0^2 - f^2)(1/Q)) \\ &= \tan^{-1}((f_0 f)/(f_0^2 - f^2)(1/Q)) \end{aligned} \tag{7}$$

When $f=f_0$, the phase difference $\theta$ is 90 degrees. The phase difference is converted by the automatic fine tuning multiplier 7 into a voltage that will be fed back through the filter 11 into the tuner 2 to thereby achieve the automatic fine tuning operation.

Figure 3:
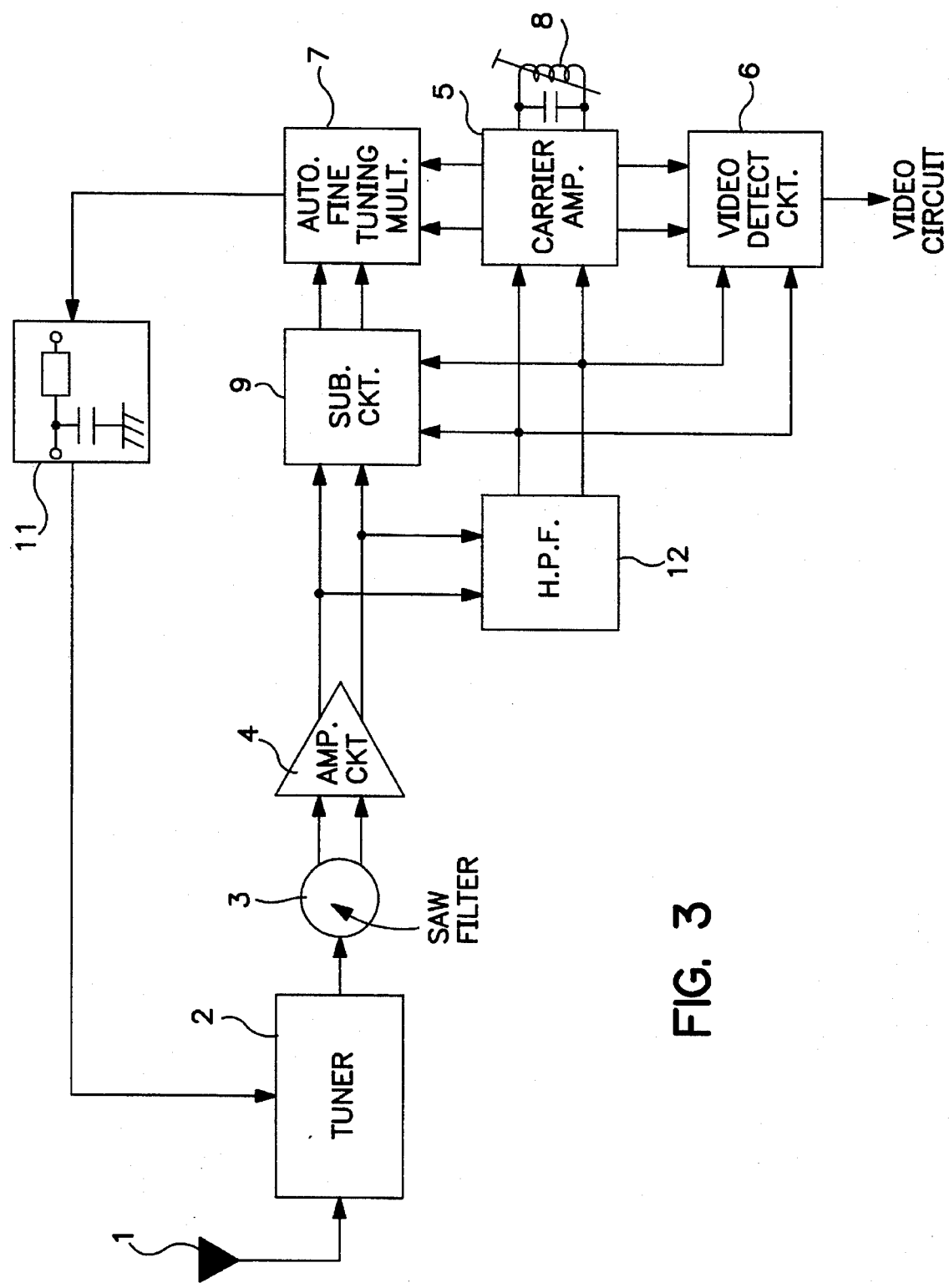
FIG. 3 is a circuit diagram illustrative of a configuration of a novel automatic fine tuning detecting circuit in a second embodiment according to the present invention.

The description will focus on a circuit configuration of a novel automatic fine tuning detection system in a second embodiment according to the present invention with reference to FIG. 3. The novel automatic fine tuning detection system of the second embodiment has a structural difference in providing a high pass filter 12. The novel system has an antenna 1 for receiving a radio wave to be converted into a radio frequency electrical signal. The novel automatic fine tuning detection system also has a tuner 2 into which the radio frequency signal received by the antenna 1 is transmitted for conversion of the radio frequency signal into a video intermediate frequency signal. The novel system also has a SAW filter for filtering the video intermediate frequency signal for band width restrictions thereof. The novel system also includes a video intermediate frequency amplifier circuit 4 for amplifying the filtered video intermediate frequency signal transmitted from the SAW filter 3. The novel system also includes a high pass filter 12 constructing a linear filter and a subtracting circuit 9 in which the amplified video intermediate frequency signal is transmitted into both the subtracting circuit 9 and the high pass filter 12. The high pass filter 12 filters the amplified video intermediate frequency signal. The novel system also includes a video detecting circuit and a carrier amplifier 5 provided with a filter 8 having a center frequency that corresponds to a frequency of the video intermediate frequency signal. The filtered video intermediate frequency signal of the high pass filter 12 is then supplied into the subtracting circuit 9, the carrier amplifier 5 and the video detecting circuit 6. The filtered video intermediate frequency signal of the high pass filter 12 or the output signal of the high pass filter 12 serves as a reference signal in this novel system. The subtracting circuit 9 subtracts the output signal of the high pass filter 12 from the amplified video intermediate frequency signal fetched from the video intermediate frequency amplifying circuit 4 to thereby generate an output signal having a phase difference by 90 degrees from the output signal supplied from the high pass filter 12. The novel system further includes an automatic fine tuning multiplier 7 into which the output signal of the subtracting circuit 9 is transmitted. The carrier amplifier 5 provided with the filter 8 extract a carrier wave signal from the filtered video intermediate frequency signal supplied from the high pass filter 12 for subsequent transmission of the extracted carrier wave signal into the video detecting circuit 6 and the automatic fine tuning multiplier 7. The video detecting circuit 6 constitutes a multiplying circuit for performing a synchronous detection of the carrier wave signal extracted by the carrier amplifier 5 with the output signal of the high pass filter 12 to thereby detect a video signal. The detected video signal is outputted from the video detecting circuit 6. The automatic fine tuning multiplier 7 multiplies the output signal of the carrier amplifier 5 by the output signal of the subtracting Circuit 9 for automatic fine tuning detection. This automatic fine tuning detection may be carried out in the quadrature system that requires a filter for converting a variation in frequency of signals into a variation in phase thereof. The filter 8 provided to the carrier amplifier 5 may serve as the filter that may convert any variation in frequency of the signal into a variation in phase. An output of the automatic fine tuning multiplier 7 is then fed back through a filter 11 into the tuner so that the center frequency of the video intermediate frequency signal is controlled at a predetermine value.

A difference $\theta$ in phase between the output signals $E_2(f)$ and $E_3(f)$ is expressed by the following equation.

$$\begin{aligned} \theta &= E_2(f) - E_3(f) \\ &= \pi/2 + \pi/2 - \tan^{-1}((f_0 f)/(f_0^2 - f^2)(1/Q)) \\ &= \pi - \tan^{-1}((f_0 f)/(f_0^2 - f^2)(1/Q)) \end{aligned} \tag{8}$$

The phase difference is converted by the automatic fine tuning multiplier 7 into a voltage that will be fed back through the filter 11 into the tuner 2 to thereby achieve the automatic fine tuning operation.

Whereas modifications of the present inventions will no doubt be apparent to a person having ordinary skill in the art, to which the invention pertains, it is to be understood that the embodiments shown and described by way of illustrations are by no means intended to be considered in a limiting sense. Accordingly, the claims are intended to cover all modifications which fall within the spirit and scope of the invention.

What is claimed is :

1. A system for carrying out automatic fine tuning detection comprising:

generating means for generating a video intermediate frequency signal from a radio wave;

filtering means connected to said generating means for filtering said video intermediate frequency signal supplied from said generating means, said filtering means having low and high frequency regions having different gains from each other, said filtering means producing an output signal;

subtracting means connected to both said generating means and filtering means for subtracting said output signal of said filtering means from said video intermediate frequency signal supplied by said generating means;

fetching and extracting means connected to said filtering means for fetching said output signal of said filtering means and for subsequently extracting a video carrier wave signal component from said output signal; and multiplying means connected to said subtracting means, said fetching and extracting means and said generating means for multiplying an output signal of said subtracting means by an output signal of said fetching and extracting means and subsequent conversion into a voltage signal to be fed back to said generating means to thereby control said video intermediate frequency signal at a predetermined frequency.

2. The system as claimed in claim 1, wherein said filtering means comprises a low pass filter circuit.

3. The system as claimed in claim 1, wherein said filtering means comprises a high pass filter circuit.

4. The system as claimed in claim 1, wherein said fetching and extracting means comprises:

a carrier amplifier circuit; and a filter connected to the carrier amplifier circuit, said filter having a center frequency equal to said predetermined frequency of the video intermediate frequency signal generated by said generating means.

5. The system as claimed in claim 1, wherein said generating means comprises:

an antenna for receiving a radio wave and for subsequently converting said radio wave into a radio frequency electrical signal;

a tuner connected to said antenna for converting said radio frequency electrical signal into said video intermediate frequency signal;

a filter connected to said tuner, said filter outputting a filtered video intermediate frequency signal; and an amplifier circuit connected to said filter for amplifying said filtered video intermediate frequency signal, said amplifier circuit being connected to said subtracting means and to said filtering means.

6. A system for carrying out automatic fine tuning detection comprising:

a generating section for generating a video intermediate frequency signal from a radio wave;

a filtering section connected to said generating section for filtering said video intermediate frequency signal supplied from said generating section, said filtering section having low and high frequency regions having different gains from each other, said filtering section producing an output signal;

a subtracting section connected to both said generating section and to said filtering section for subtracting said output signal of said filtering section from said video intermediate frequency signal supplied by said generating section;

an extracting section connected to said filtering section for fetching said output signal of said filtering section and for subsequently extracting a video carrier wave signal component from said output signal; and a multiplying section connected to said subtracting section, said extracting section and said generating section for multiplying an output signal of said subtracting section by an output signal of said extracting section and subsequent conversion into a voltage signal to be fed back to said generating section to thereby control said video intermediate frequency signal at a predetermined frequency.

7. The system as claimed in claim 6, wherein said filtering section comprises a low pass filter circuit.

8. The system as claimed in claim 6, wherein said filtering section comprises a high pass filter circuit.

9. The system as claimed in claim 6, wherein said extracting section comprises:

a carrier amplifier circuit; and a filter connected to the carrier amplifier circuit, said filter having a center frequency equal to a frequency of said video intermediate frequency signal generated by said generating section.

10. The system as claimed in claim 6, wherein said generating section comprises:

an antenna for receiving a radio wave and for subsequently converting said radio wave into a radio frequency electrical signal;

a tuner connected to said antenna for converting said radio frequency electrical signal into said video intermediate frequency signal;

a filter connected to said tuner, said filter outputting a filtered video intermediate frequency signal; and an amplifier circuit connected to said filter for amplifying said filtered video intermediate frequency signal, said amplifier circuit being connected to said subtracting section and to said filtering section.

11. A system for carrying out automatic fine tuning detection comprising:

an antenna for receiving a radio wave and for subsequently converting said radio wave into a radio frequency electrical signal;

a tuner connected to said antenna for converting said radio frequency electrical signal into a video intermediate frequency signal;

a filter connected to said tuner, said filter outputting a filtered video intermediate frequency signal;

an amplifier circuit connected to said filter for amplifying said filtered video intermediate frequency signal said amplifier circuit outputting an amplified video intermediate frequency signal;

a filtering section connected to said amplifier circuit for filtering said amplified video intermediate frequency signal, said filtering section having low and high frequency regions having different gains from each other, said filtering section producing an output signal;

a subtracting section connected to both said amplifying circuit and to said filtering section for subtracting said output signal of said filtering section from said amplified video intermediate frequency signal;

an extracting section connected to said filtering section for fetching said output signal of said filtering section and for subsequently extracting a video carrier wave signal component from said output signal of said filtering section, said extracting section comprising a carrier amplifier circuit and a filter connected to the carrier amplifier circuit and having a center frequency equal to a frequency of the video intermediate frequency signal generated by said tuner; and a multiplying section connected to said subtracting section, said extracting section and said tuner for multiplying an output signal of said subtracting section by an output signal of said extracting section and subsequent conversion into a voltage signal to be fed back to said tuner to thereby control the frequency of said video intermediate frequency signal at a predetermined frequency.

* * * * *